(12) United States Patent
Bouru

(10) Patent No.: US 7,300,245 B2
(45) Date of Patent: Nov. 27, 2007

(54) STATOR VANE STAGE ACTUATED BY AN AUTOMATICALLY-CENTERING ROTARY ACTUATOR RING

(75) Inventor: Michel Andre Bouru, Montereau sur le Jard (FR)

(73) Assignee: Snecma, Paris (FR)

( * ) Notice: Subject to any disclaimer, the term of this patent is extended or adjusted under 35 U.S.C. 154(b) by 47 days.

(21) Appl. No.: 11/296,298

(22) Filed: Dec. 8, 2005

(65) Prior Publication Data

US 2006/0133925 A1 Jun. 22, 2006

(30) Foreign Application Priority Data

Dec. 16, 2004 (FR) ................................... 0413387

(51) Int. Cl.
F04D 29/56 (2006.01)
(52) U.S. Cl. ........................................ 415/147; 415/160
(58) Field of Classification Search ................ 415/160, 415/147, 150, 151, 154.2
See application file for complete search history.

(56) References Cited

U.S. PATENT DOCUMENTS

| | | | |
|---|---|---|---|
| 3,990,809 A | * | 11/1976 | Young et al. ............... 415/160 |
| 4,130,375 A | | 12/1978 | Korta |
| 4,373,859 A | * | 2/1983 | Thebert ...................... 415/159 |
| 4,430,043 A | | 2/1984 | Knight et al. |
| 4,979,874 A | * | 12/1990 | Myers ........................ 415/160 |
| 5,096,374 A | * | 3/1992 | Sakai et al. ................. 415/150 |

FOREIGN PATENT DOCUMENTS

| | | |
|---|---|---|
| CH | 363661 | 8/1962 |
| GB | 1 499 531 | 2/1978 |

* cited by examiner

*Primary Examiner*—Igor Kershteyn
(74) *Attorney, Agent, or Firm*—Oblon, Spivak, McClelland, Maier & Neustadt, P.C.

(57) ABSTRACT

A variable pitch stator vane stage, said vanes being moved by an automatically-centered rotary actuator ring. The casing carries a stationary coaxial annular rail projecting from its outside surface, and circumferentially spaced apart moving equipments are provided that are constrained to move along said rail, each moving equipment being coupled to the actuator ring via a radial guide arrangement.

17 Claims, 7 Drawing Sheets

STATOR VANE STAGE ACTUATED BY AN AUTOMATICALLY-CENTERING ROTARY ACTUATOR RING

The invention relates to a turbomachine having a stator that includes at least one variable-pitch stator vane stage arranged in a casing, said vanes being moved by a rotary actuator ring located outside the casing and carried by the casing. The invention relates to an improvement to this type of actuator ring making it possible in particular to center the actuator ring automatically under all circumstances with very small operating clearance. The invention applies in particular to the field of airplane jet engines and more particularly to a compressor included in such a jet engine.

BACKGROUND OF THE INVENTION

In a turbomachine of the kind specified above, a compressor stator is fitted with at least one stator vane stage that is of variable pitch, i.e. the position of the vanes in the flow section is adjustable. More precisely, the angle of attack of the vanes is controlled as a function of operating conditions by a servo-control system which causes a rotary actuator ring outside the casing to move, the actuator ring being connected to said vanes by respective cranks.

Conventionally, such an actuator ring includes radially-adjustable centering pads whereby it is positioned around the casing by pressing thereagainst. Each centering pad presses against a track on the casing, i.e. on a projection defined on its surface, the projections being machined so that their contact surfaces occupy a cylindrical surface of axis that coincides with the axis of the turbomachine.

The adjustments for ensuring a satisfactory coaxial position of the actuator ring are difficult to perform and take time. In addition, once the adjustment has been performed, it is necessary to give clearance to the sliding assembly between said pads and said projections in order to accommodate the variation in dimensions due to temperature variations in operation. This necessary clearance of about 0.7 millimeters (mm) to 0.8 mm goes against the desired centering.

In another design, U.S. Pat. No. 4,130,375 describes an actuator ring that moves circularly only, the ring being made up of two superposed rings. The inner ring constitutes a track ring mounted stationary on the casing by means of radially-extending studs, and the outer ring is the actuator ring proper, being attached via links to vane-actuation cranks and running on the track ring via a system of wheels. Such a system is heavy and bulky, other things being equal.

OBJECTS AND SUMMARY OF THE INVENTION

The invention relates to a significant improvement compared with the above-mentioned prior solutions.

More precisely, the invention relates to a stage of variable-pitch stator vanes, comprising vanes arranged in a casing, said vanes being moved by an actuator ring outside said casing and carried by the casing, and said actuator ring being connected via cranks to the vanes of said stage in order to actuate them simultaneously, wherein said casing has a stationary coaxial annular rail projecting from its outside surface, wherein at least three circumferentially-spaced moving equipments are constrained to move along said rail, and wherein each moving equipment is coupled to said rail by a radial guide arrangement.

The structure of the invention makes it possible to obtain an actuator ring of low weight that is accurately coaxial and does not have any operating clearance for expansion. In addition, assembly and adjustment are very simple and fast.

The system of the invention guarantees the initial quality of centering on a permanent basis, regardless of temperature and regardless of the materials used for the actuator ring and the casing. Control over the position of the drive ring is also improved during all stages of control. The risks of the actuator ring warping that used to be due to non-uniformity in the transmission of control forces are greatly reduced.

The proposed system can make do with a minimum of three to four of the above-mentioned moving equipments disposed at substantially equal distances from one another circumferentially.

The driving forces are greatly reduced by the omission of the forces due to friction on the prior art centering pads, where friction represented about 30% of the overall drive force. The resulting saving can be made use of in the dimensioning of the control actuator(s) or of any other control device.

Compared with the system described in the above-mentioned US patent, it should be observed that the weight and the dimensions of the drive ring are greatly reduced, since the inner ring of the system described in that patent is omitted.

In one possible embodiment, the rail is made up of two parallel track rings secured to said casing, and the moving equipments are shaped to move between these two track rings.

For example, the two track rings are provided with facing lateral rims and the moving equipments include V-groove wheels engaging with said side rims.

In an embodiment, each moving equipment includes a support surrounding said actuator ring, and said wheels are mounted to rotate freely on said support.

For each moving equipment, said radial guide arrangement includes an element engaged radially in a hole in said actuator ring, said element being carried by said moving equipment. The actuator ring slides freely radially along said element without significant circumferential clearance. For example, the element may comprise a rod secured to the support, surrounded by an anti-friction bushing received in said radial hole in the actuator ring. The anti-friction bushing may also be replaced by a tubular rolling cage (e.g. a ball cage) or preferably by a ball recirculation system.

In another variant, said rail is made of a single track ring secured to said casing, and each moving equipment has guide elements in lateral contact with said rail, on either side thereof, preferably via rolling means.

The invention also concerns a compressor provided with one stator vane stage as defined above and a turbomachine comprising at least one such a compressor.

BRIEF DESCRIPTION OF THE DRAWINGS

The invention can be better understood and other advantages thereof appear more clearly in the light of the following description of a complete embodiment and a few variants, given purely as examples and made with reference to the accompanying drawings, in which.

MORE DETAILED DESCRIPTION

Figure 1:
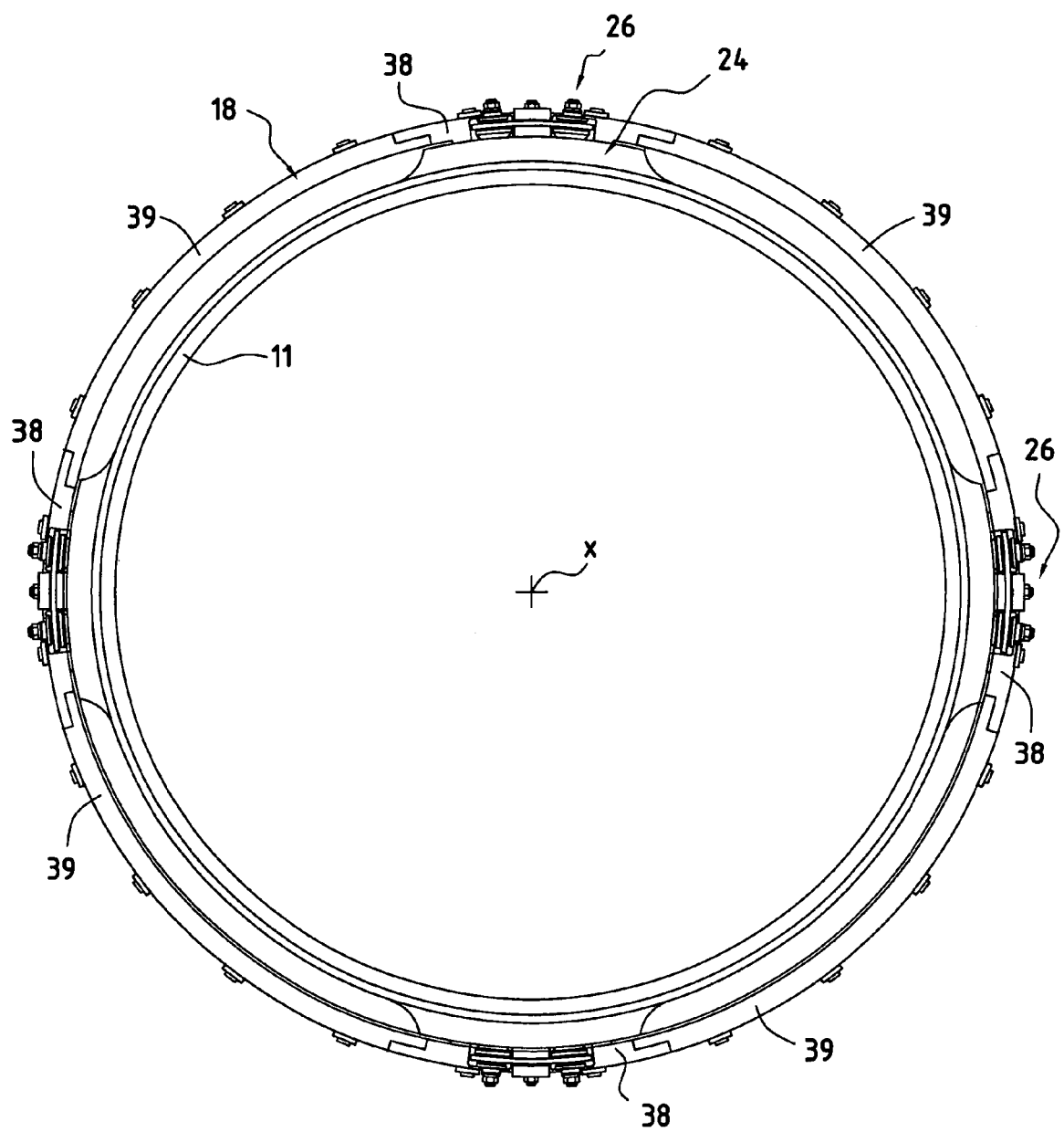
FIG. 1 is a view occupying a section of the casing, perpendicularly to the axis of the turbomachine, and showing how the actuator ring is mounted around said casing.
Figure 2:
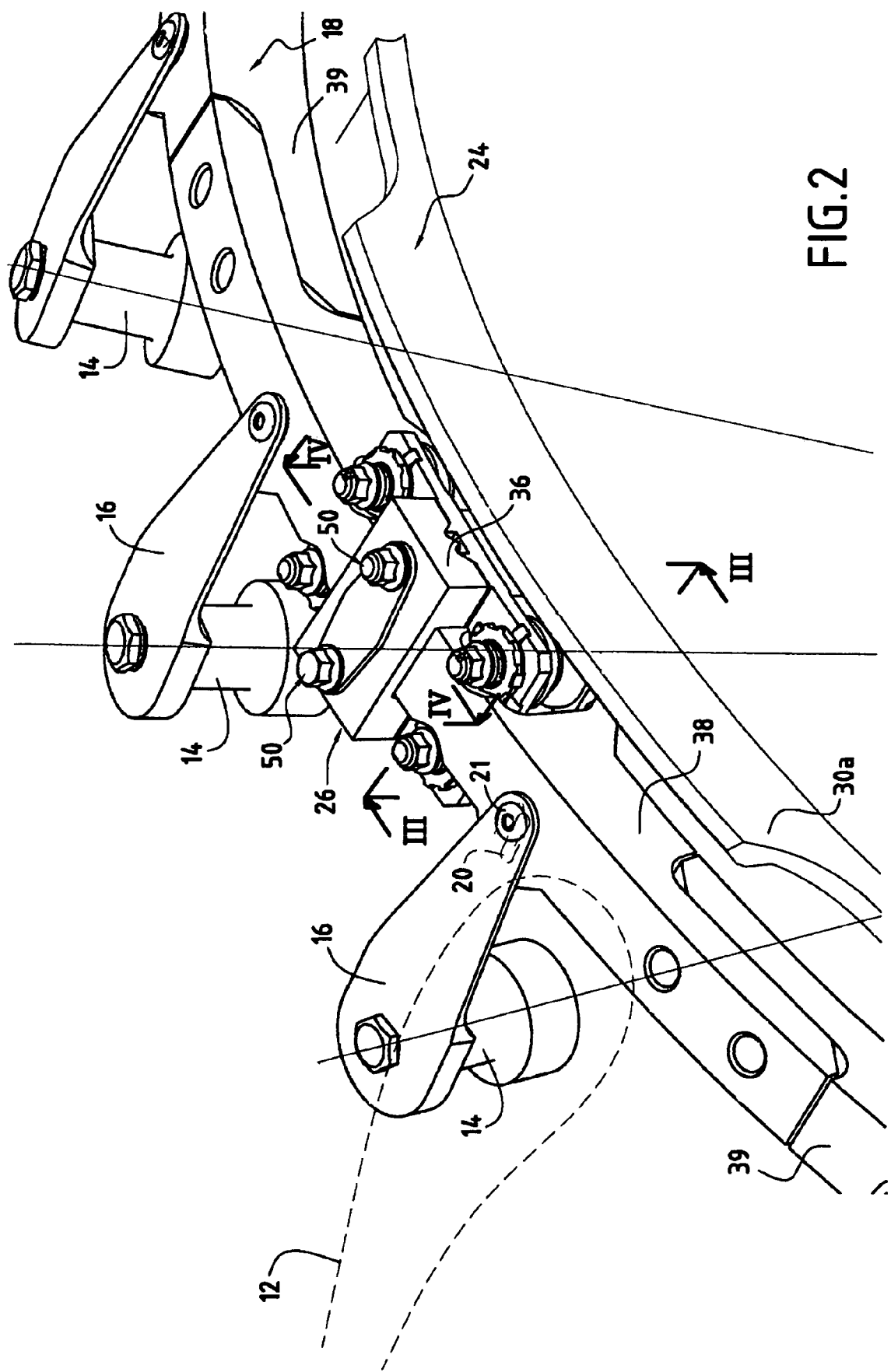
FIG. 2 is a detail view in perspective of the actuator ring mounted on the casing.

With reference more particularly to FIGS. 1 to 4, there can be seen the casing 11 of a turbomachine of axis X, which casing houses variable-pitch stator vanes 12, one of which is visible in FIG. 2. Each vane has a pivot 14 projecting from the casing and connected via a crank 16 to an actuator ring 18 outside the casing. The radial crank-drive holes 20 formed in the actuator ring and having tenons 21 engaged therein that are secured to the ends of the cranks are oblong since said actuator ring moves in rotation only. It will be understood that turning the actuator ring circumferentially causes all of the vanes 12 to pivot simultaneously inside the casing by the same amount. Thus, when the invention is applied to an airplane jet engine, the orientation of the vanes can be adjusted as a function of flying conditions. The main object of the invention is to provide very good centering of the actuator ring 18 with very small operating clearance, said centering not being disturbed by differences in expansion between the casing and the actuator ring.

To do this, the casing carries on the outside a stationary coaxial annular rail 24 which in the example shown is integral with the wall of the casing and projects from its outside surface. At least three moving equipments 26 that are spaced apart circumferentially and that are preferably substantially equidistant from one another are constrained to move along the rail. The rail is provided in full only over those segments where it is functionally useful (see FIG. 1), i.e. along the paths of the moving equipments 26. The rail is omitted over the other segments, thereby achieving a significant saving in weight and making it easier to put the moving equipments into place. In addition, as described below, each moving equipment 26 is coupled to the actuator ring by a radial guide arrangement 28 ensuring perfect automatic centering of the actuator ring 18 relative to the axis of the turbomachine. In the example, four moving equipments 26 are provided that are regularly spaced apart at 90° from one another, each carrying a radial guide arrangement 28.

In the presently-described example, the rail 24 is made up of two parallel track rings 30a, 30b secured to the casing (in fact track ring segments), and the moving equipments 26 are shaped to move between these respective track rings, more precisely between these track ring segments. In addition, the two track rings 30a, 30b are provided with facing lateral rims 32a, 32b and the moving equipments include V-groove wheels 34 in rolling engagement on said lateral rims. Furthermore, each moving equipment 26 has a support 36 surrounding said actuator ring. The wheels are mounted to rotate freely on said support.

In the example, each moving equipment 26 includes four V-groove wheels 34 co-operating in pairs with the two rims 32a and 32b, respectively. The support 36 surrounds the actuator ring and the wheels 34 are mounted to turn freely on the support. The actuator ring is made up of an assembly of a plurality of curved segments 38, 39 provided with flats at their ends and fixed end to end, e.g. by crimping or bolting, so as to build up an annular structure. Each segment 38 carrying a moving equipment 26 presents two cavities 40 in which the wheels engage in part, together with portions of the support 36. A radial hole 42 extends between the two cavities to receive said radial guide arrangement 28 as described below.

The moving equipment 26 is made by assembling together two side plates 44 and 45 and two circumferential plates 46, 47, respectively an outer plate 46 extending above the actuator ring (i.e. radially outside it) and an inner plate 47 extending between the actuator ring and the casing. Each of the side plates 44 and 45 defines two forks 48 for holding the two wheels 34 that engage the same rim 30a or 30b of the rail. The forks of the side plates are in register with cavities 40 formed in the actuator ring.

The side plates 44, 45 and the circumferential plates 46, 47 have V ribs and grooves that engage mutually on assembly, thereby ensuring that they are accurately positioned relative to one another around the actuator ring 18. Assembly requires only two bolts 50 to be engaged in corresponding holes in said plates. The two bolts 50 extend radially on either side of the actuator ring 18.

Figure 3:
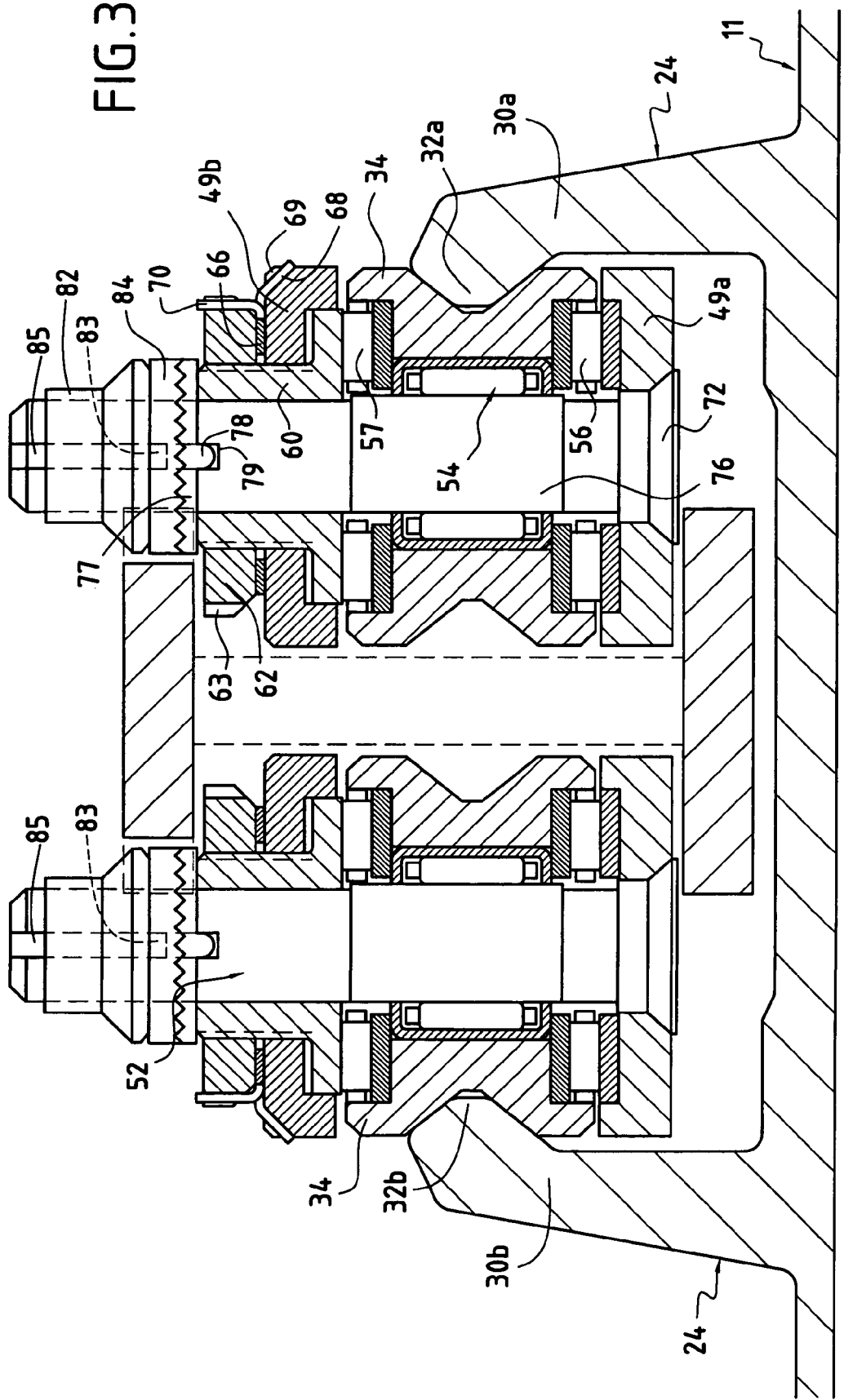
FIG. 3 is a section view on III-III of FIG. 2.
Figure 4:
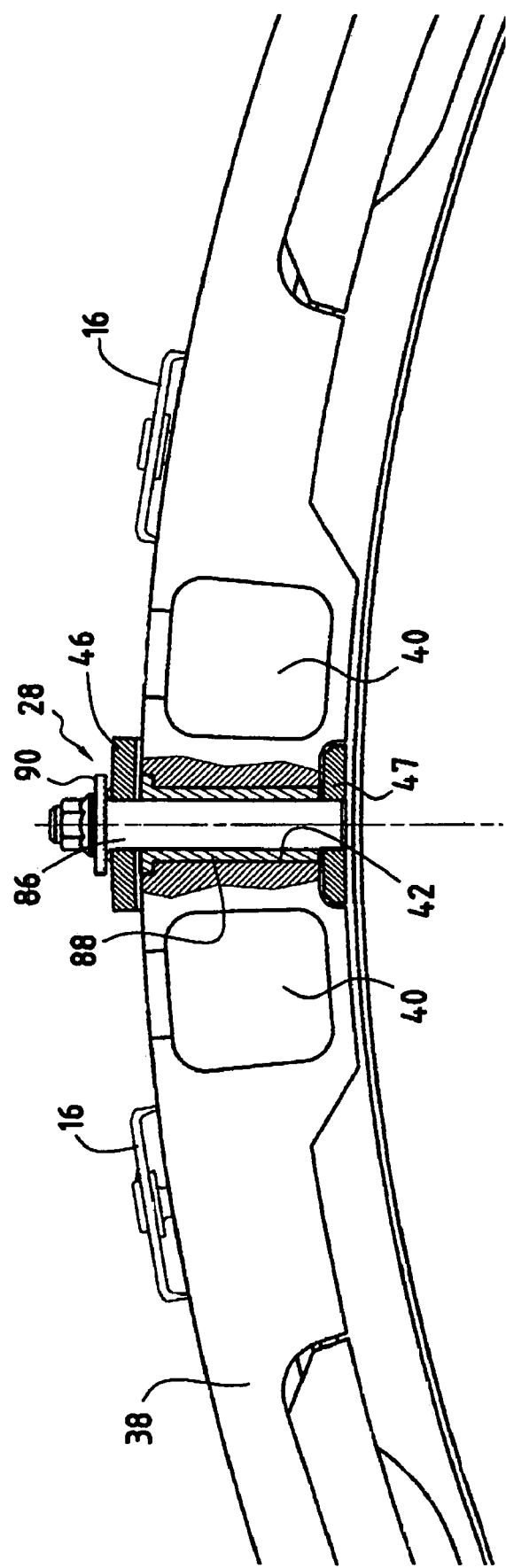
FIG. 4 is a fragmentary section on IV-IV of FIG. 2.
Figure 5:
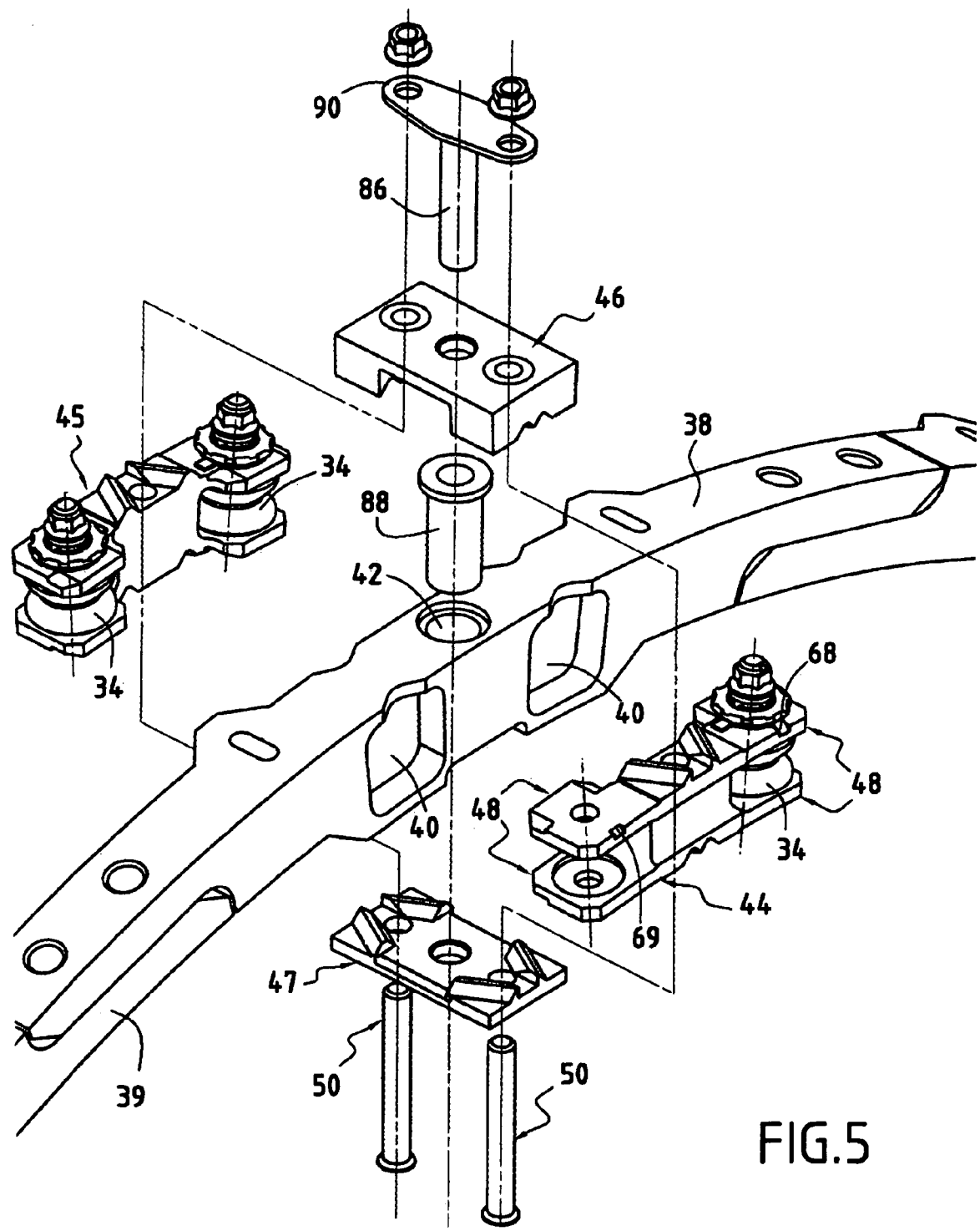
FIG. 5 is an exploded fragmentary view of a moving equipment around the actuator ring.

FIG. 3 shows more clearly how the wheels 34 are mounted on the moving equipment.

Each wheel 34 is mounted on a hub-forming element 52 secured to the support 36. This element is installed between the two branches 49a and 49b of the corresponding fork 48 of the side plate. It extends substantially radially relative to the casing.

Bearing means 54, in this case a needle bearing, is interposed between said hub-forming element 52 and the wheel 34. A needle abutment 56 is interposed between the bottom branch 49a of the fork and the wheel 34. Another needle abutment 57 is interposed between the wheel 34 and the top branch 49b of the fork. The terms "bottom" and "top" are used herein for convenience relative to the positions of the elements as shown in FIG. 3. The top track of the needle abutment 57 is extended by a threaded sleeve 60 screwed into the top branch 49b of the fork. The position of this sleeve 60 can be adjusted in order to adjust the functional clearance of the needle abutments. The position of said top track is stabilized by tightening a lock-nut 62 with peripheral notches 63. A washer 66 provided with tabs is interposed between the lock-nut 62 and the top branch 49b of the fork. It serves to prevent the lock-nut from turning after the sleeve has been positioned and the lock-nut has been tightened. To do this, a tab 68 is folded down into a notch 69 of said top branch of the fork and another tab 70 is folded down into one of the peripheral notches of the lock-nut. The bottom end of said hub-forming assembly has an enlarged (frustoconical) portion 72 in abutment against the bottom branch 49a of the fork.

Said hub-forming element 52 is also provided with a portion 76 that is slightly eccentric relative to the other two portions whereby it is secured to the support. The V-groove wheel 34 is mounted to rotate on said eccentric portion, in this case via the needle bearing.

The angular position in which said hub-forming element 52 is mounted can be adjusted so as to enable the clearance between said wheel 34 and said rail 24 to be adjusted.

More precisely, a corrugated washer 77 has a stud 78 engaged in a notch 79 of the sleeve 60. It is thus prevented from turning relative to the support 36. The hub-forming element 52 of the cross-member is terminated by a threaded segment onto which a collared nut 82 is screwed. Another corrugated washer 84 is interposed between said collared nut 82 and the corrugated washer 77. The radial corrugations of the washers interfit. The corrugated washer 84 has an internal stud 83 engaged in a longitudinal groove 85 formed along the top end portion of said hub-forming element 52 so as to be constrained to turn therewith. This makes it possible to adjust the position of the eccentric carrying the V-groove wheel 34 so as to adjust its position relative to the rail. Once this position has been determined, tightening the nut 82 mutually engages the corrugated washers one in the other and stabilizes the adjustment.

Furthermore, and as mentioned above, each moving equipment 26 includes a radial guide arrangement 28 for guiding said actuator ring. This arrangement comprises an element 86 engaged radially in the radial hole 42 in the actuator ring that is situated between the two cavities 40. This element is carried by the moving equipment. It is constituted by a radial guide pin passing through the two circumferential plates 46 and 47 of the moving embodiment and engaged in an anti-friction bushing 88 positioned in the radial hole 42 in the actuator ring. The guide pin is engaged in the bushing; it is secured to a plate 90 which is itself clamped against the nut of the two bolts 50 used for assembling together the plates 44, 45, 46, and 47. The anti-friction bushing 88 could be replaced by a tubular rolling bearing (e.g. a ball cage), or preferably by a ball recirculation system.

In operation, temperature variations induce relative variations of diameter between the casing 11 and the actuator ring 18, but these have no consequence on the centering of the actuator ring about the axis X of the turbomachine. The radial guide arrangements 28 enable the variations of diameter between the casing and the actuator ring to be accommodated without affecting the centering of the actuator ring providing said radial guide arrangements are at least three in number and are spaced apart circumferentially. Furthermore, the temperature variations do not affect the rolling of the wheels 34 along the annular rail 24 of the casing.

Figure 6:
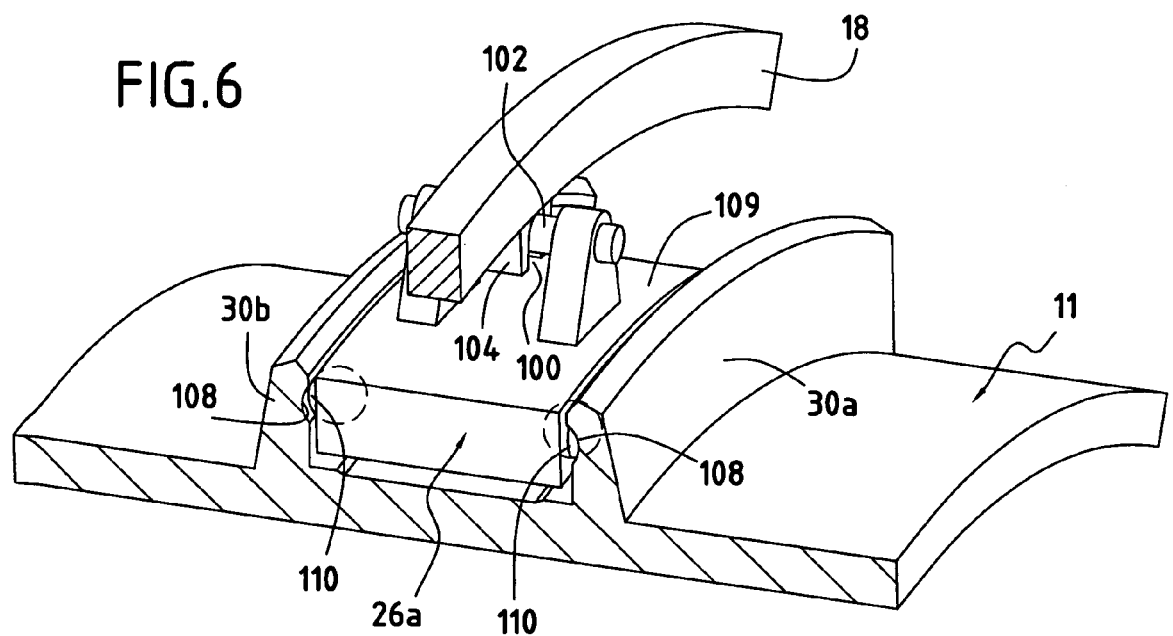
FIG. 6 to 8 are views similar to FIG. 2 showing variants.
Figure 8:
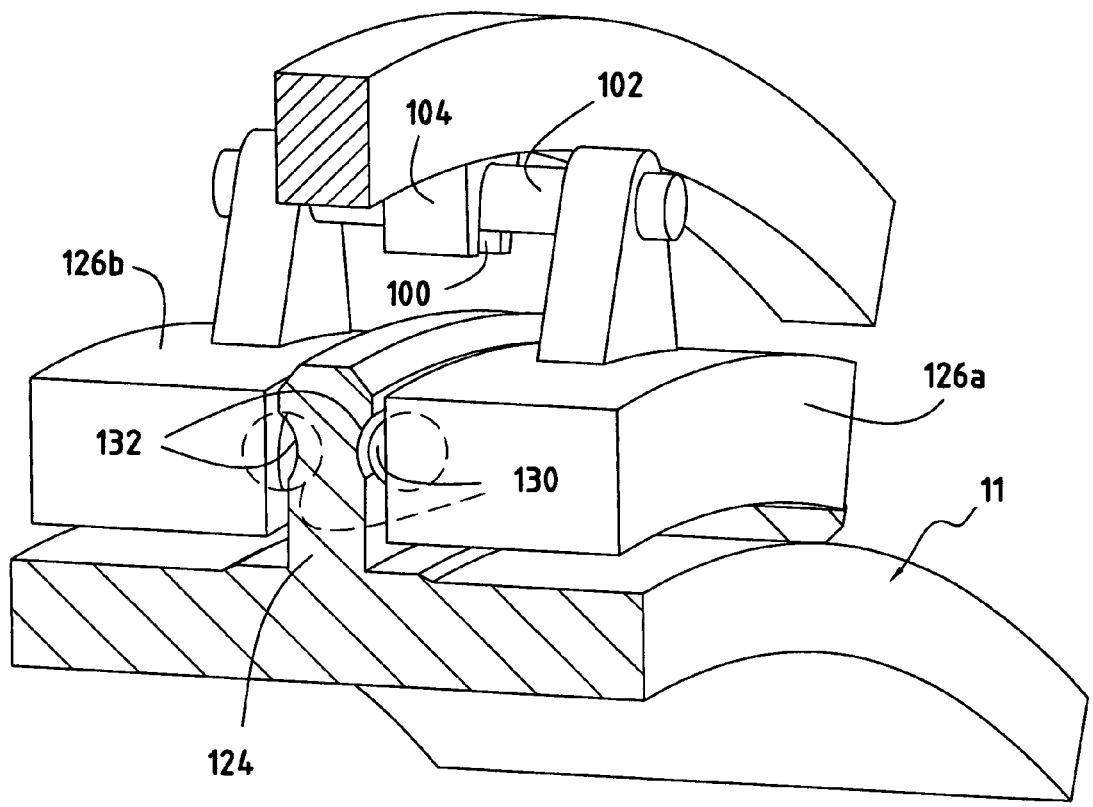
Figure 7:
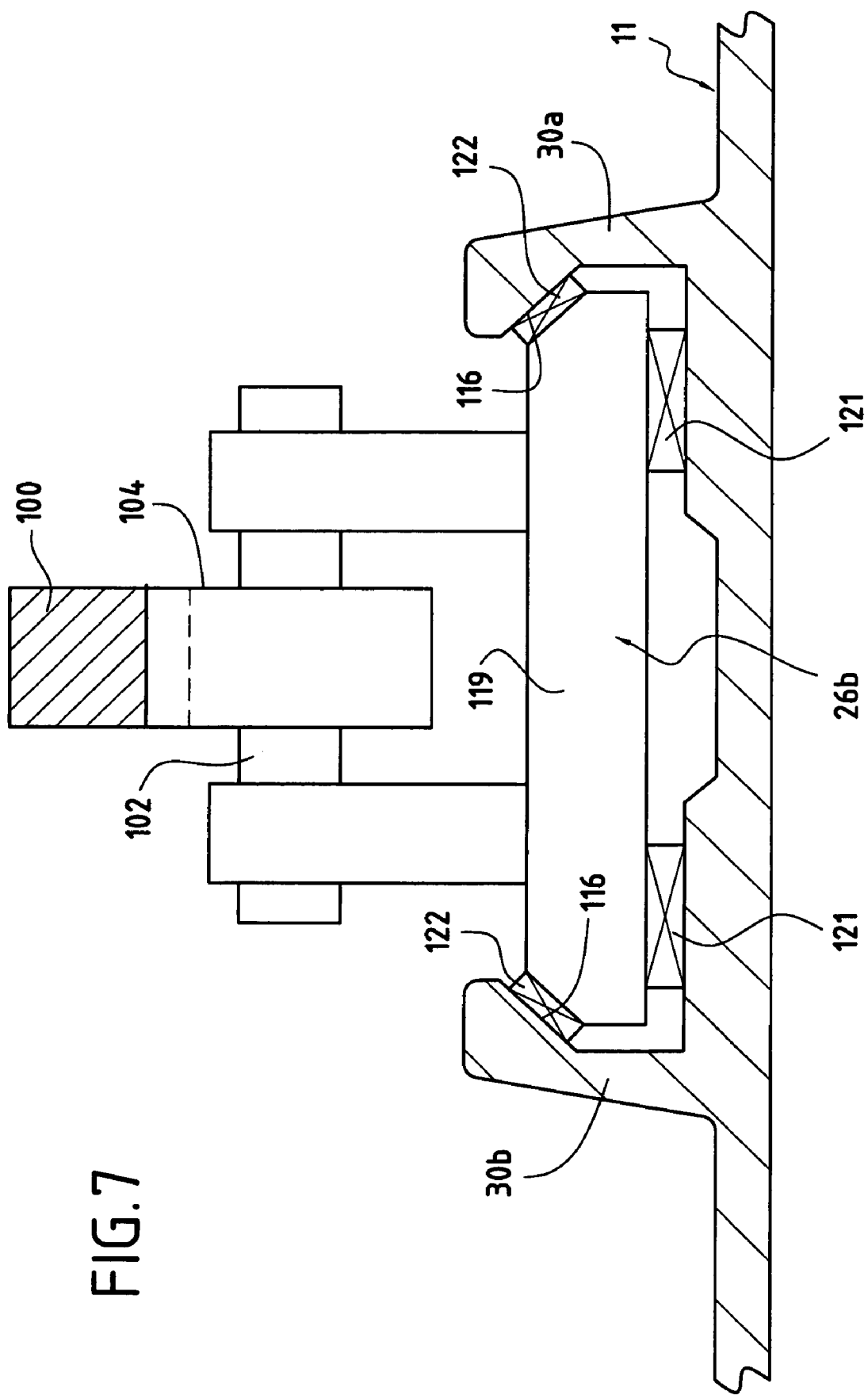

FIGS. 6 to 8 show other variants in which elements that are analogous to those described above carry the same numerical references.

In these embodiments, for each moving equipment, said radial guide arrangement has a radial slot 100 formed in a fraction of the height of said actuator ring 18 and slidably receives a rod 102 extending parallel to the axis of rotation X, said rod being a snug fit therein (i.e. having no circumferential clearance) and being carried by the moving equipment. Bearing means could be interposed between the rod 102 and said radial slot 100 in order to improve the quality of the radial guidance.

The radial slot 100 is implemented in this example in an internal radial extension 104 of the actuator ring 18 in order to lighten the actuator ring.

In FIG. 6, the two track rings 30*a* and 30*b* of the rail are provided with facing lateral grooves 108 and each moving equipment 26*a* has a base 109 that extends between these two track rings. The edge faces of the base facing these two track rings carry rolling elements 110 engaged in said lateral grooves. In this example, the rolling elements are balls. Advantageously, the base can contain two ball circulation circuits. The rod 102 is carried by said base 109 in a fork.

In another embodiment (FIG. 7) the two track rings 30*a* and 30*b* are provided with facing frustoconical surfaces 116 and each moving equipment 26*b* comprises a base 119 extending between the two track rings. Sliding is ensured by contact pads made of anti-friction material. There can be seen pads 121 carried by the bottom face of the face and pads 122 carried by the two edge faces facing the track rings 30*a* and 30*b*. These pads co-operate respectively with the outside surface of the casing 11 between the two track rings and with the frustoconical surfaces 116. Conversely, the anti-friction pads could be located along the side faces of the track rings and along the outside surface of the casing. In which case, the pads need to be longer in the circumferential direction in order to accommodate the rotary stroke of the actuator ring.

In yet another embodiment (FIG. 8), the rail 124 is made up of a single track ring secured to said casing, and each moving equipment comprises guide elements 126*a*, 126*b* contacting opposite sides of said rail. Preferably rolling means 130 are interposed between the guide elements 126*a*, 126*b* and the rail 124. In the example described more specifically, the track ring has two opposite annular side grooves 132, each guide element having rolling means 130 engaged in these grooves. In this example the rolling elements are balls.

In yet another possible variant, the anti-friction bushings 88 can be replaced by ball-and-socket arrangements mounted on the rods 86. This variant is advantageous when the deformation of the actuator ring is too great to be absorbed by the system described with reference to FIG. 4.

What is claimed is:

1. A stage of variable pitch stator vanes, comprising vanes arranged in a casing, said vanes being moved by an actuator ring outside said casing and carried by the casing, and said actuator ring being connected via cranks to the vanes of said stage in order to actuate them simultaneously, wherein said casing has a stationary coaxial annular rail projecting from its outside surface, wherein at least three circumferentially-spaced moving equipments are constrained to move along said rail, and wherein each moving equipment is coupled to said rail by a radial guide arrangement.

2. A vane stage according to claim 1, wherein said rail is made up of two parallel track rings secured to said casing, and wherein the moving equipments are shaped to move between these two track rings.

3. A vane stage according to claim 2, wherein the two track rings are provided with facing lateral rims and wherein the moving equipments include V-groove wheels engaging with said side rims.

4. A vane stage according to claim 3, wherein each moving equipment includes a support surrounding said actuator ring, and wherein said wheels are mounted to rotate freely on said support.

5. A vane stage according to claim 4, wherein each wheel is mounted on a hub-forming element secured to said support, and extending substantially radially relative to said casing.

6. A vane stage according to claim 5, wherein rolling means are interposed between said hub-forming element and said wheel.

7. A vane stage according to claim 5, wherein said hub-forming element is provided with a portion that is eccentric relative to two end portions whereby it is secured to said support, wherein the wheel is mounted to rotate on said eccentric portion, and wherein the angular position in which said hub-forming element is mounted on said support is adjustable to enable the clearance between said wheel and said rail to be adjusted.

8. A vane stage according to claim 2, wherein the two track rings are provided with facing side grooves, wherein each moving equipment include a base extending between the two track rings, and wherein the edge faces of said base facing said track rings carry rolling elements engaged in said side grooves.

9. A vane stage according to claim 2, wherein the two track rings are provided with facing frustoconical surfaces, wherein each moving equipment includes a base extending between the two track rings, and wherein the bottom face of said base and its edge faces facing said two track rings carry contact pads of anti-friction material, co-operating respectively with the outside surface of the casing, between the two track rings, and with said frustoconical surfaces.

10. A vane stage according to claim 1, wherein said rail is made of a single track ring secured to said casing, wherein each moving equipment has guide elements in lateral contact with said rail, on either side thereof.

11. A vane stage according to claim 10, wherein said track ring includes two opposite annular side grooves, each moving equipment having rolling means engaged in said grooves.

12. A vane stage according to claim 1, wherein, for each moving equipment, said radial guide arrangement includes an element engaged radially in a hole in said actuator ring, said element being carried by said moving equipment.

13. A vane stage according to claim 12, wherein said element includes a rod, and wherein said rod is surrounded by an anti-friction bushing or by a tubular rolling cage.

14. A vane stage according to claim 12, wherein, for each moving equipment, said radial guide arrangement includes a radial slot formed in a fraction of the height of said actuator ring, in which a rod is slidably engaged without circumferential clearance, the rod extending parallel to the axis of rotation and being carried by said moving equipment.

15. A vane stage according to claim 14, wherein rolling means are interposed between each said rod and said radial slot.

16. A compressor provided with at least one stator vane stage of variable pitch according to claim 1.

17. A turbomachine including at least one compressor according to claim 16.

* * * * *